United States Patent
Jenkins et al.

(10) Patent No.: US 10,473,827 B1
(45) Date of Patent: Nov. 12, 2019

(54) FRESNEL LENS WITH TEXTURED DRAFT SURFACES

(71) Applicant: Facebook Technologies, LLC, Menlo Park, CA (US)

(72) Inventors: Kurt Jenkins, Sammamish, WA (US); Shizhe Shen, Foster City, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 53 days.

(21) Appl. No.: 15/816,030

(22) Filed: Nov. 17, 2017

(51) Int. Cl.
*G02B 3/08* (2006.01)
*B29D 11/00* (2006.01)
*G02B 27/01* (2006.01)
*B29C 43/52* (2006.01)
*B29C 45/72* (2006.01)
*B05D 1/00* (2006.01)
*B29C 45/00* (2006.01)

(52) U.S. Cl.
CPC ............... *G02B 3/08* (2013.01); *B05D 1/005* (2013.01); *B29C 43/52* (2013.01); *B29C 45/0053* (2013.01); *B29C 45/7207* (2013.01); *B29D 11/0048* (2013.01); *B29D 11/00269* (2013.01); *G02B 27/0172* (2013.01); *B29C 2045/0079* (2013.01); *G02B 2027/0138* (2013.01)

(58) Field of Classification Search
CPC .................. G02B 3/08; G02B 27/0172; G02B 2027/0138; B05D 1/005; B29C 43/52; B29C 45/0053; B29C 45/7207; B29C 2045/0079; B29D 11/00269; B29D 11/0048
USPC ................... 359/457, 742; 264/1.35, 2.5, 2.7
See application file for complete search history.

(56) References Cited

U.S. PATENT DOCUMENTS

| | | | | |
|---|---|---|---|---|
| 5,062,786 A | * | 11/1991 | Arai | B29C 45/73 264/486 |
| 2002/0071187 A1 | * | 6/2002 | Kono | B29C 33/42 359/742 |
| 2002/0125589 A1 | * | 9/2002 | Katzir | G01N 21/552 264/1.23 |
| 2006/0001963 A1 | * | 1/2006 | Ishikawa | G02B 3/08 359/457 |

* cited by examiner

*Primary Examiner* — William Choi
(74) *Attorney, Agent, or Firm* — Morgan, Lewis & Bockius LLP

(57) ABSTRACT

A method for preparing a die for molding of a Fresnel lens includes obtaining a first die block that defines at least one or more portions of a Fresnel lens. The one or more portions defined in the first die block correspond to a plurality of slope facets and a plurality of draft facets. The method also includes adding textures to one or more portions of the first die block that correspond to at least a portion of the plurality of draft facets. A method of making a Fresnel lens includes obtaining the first die block, obtaining a second die block, and coupling the first and the second die blocks. The method also includes providing a molding material into a space defined between the first and the second die blocks, curing the molding material, and removing the Fresnel lens from the first and/or the second die block.

20 Claims, 11 Drawing Sheets

FRESNEL LENS WITH TEXTURED DRAFT SURFACES

TECHNICAL FIELD

This relates generally to optical lenses, and more specifically to optical lenses used in head-mounted display devices.

BACKGROUND

Head-mounted display devices (also called herein head-mounted displays) are gaining popularity as means for providing visual information to user. However, the size and weight of conventional head-mounted displays have limited applications of head-mounted displays.

SUMMARY

Accordingly, there is a need for head-mounted displays that are compact and light, thereby enhancing the user's virtual-reality and/or augmented reality experience.

Fresnel lenses provide apertures and focal lengths comparable to conventional lenses. Because Fresnel lenses are typically thinner and lighter than conventional lenses of similar performance features (e.g., aperture and/or focal length), replacing conventional lenses in head-mounted displays with Fresnel lenses can reduce the size and weight of the head-mounted displays. However, Fresnel lenses suffer from diffractions and other optical artifacts associated with Fresnel structures, and thus, their use in imaging applications is limited.

Thus, there is a need for lenses that are compact and light while reducing optical artifacts associated with such lenses.

The above deficiencies and other problems associated with conventional lenses are reduced or eliminated by the disclosed lens. In some embodiments, the lens is included in a display device. In some embodiments, the device is a head-mounted display device. In some embodiments, the device is portable.

In accordance with some embodiments, a method for preparing a die for molding a Fresnel lens includes obtaining a first die block that defines at least one or more portions of a Fresnel lens. The one or more portions defined in the first die block correspond to a plurality of slope facets and a plurality of draft facets. The method also includes adding textures to one or more portions of the first die block that correspond to at least a portion of the plurality of draft facets.

In accordance with some embodiments, a method of making a Fresnel lens includes obtaining the first die block described herein above and obtaining a second die block. The second die block is distinct and separate from the first die block. The method also includes coupling the first die block and the second die block, and providing a molding material into a space defined between the first die block and the second die block. The method further includes curing the molding material located between the first die block and the second die block to form a Fresnel lens, and removing the Fresnel lens from the first die block and/or the second die block.

Thus, the disclosed embodiments provide Fresnel lenses with reduced optical artifacts, and methods and means for making such lenses by molding.

Embodiments according to the invention are in particular disclosed in the attached claims directed to a die block, a lens and corresponding methods, wherein any feature mentioned in one claim category, e.g. lens, can be claimed in another claim category, e.g. in a method or use claim, as well. The dependencies or references back in the attached claims are chosen for formal reasons only. However any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

DETAILED DESCRIPTION

Figure 1A:
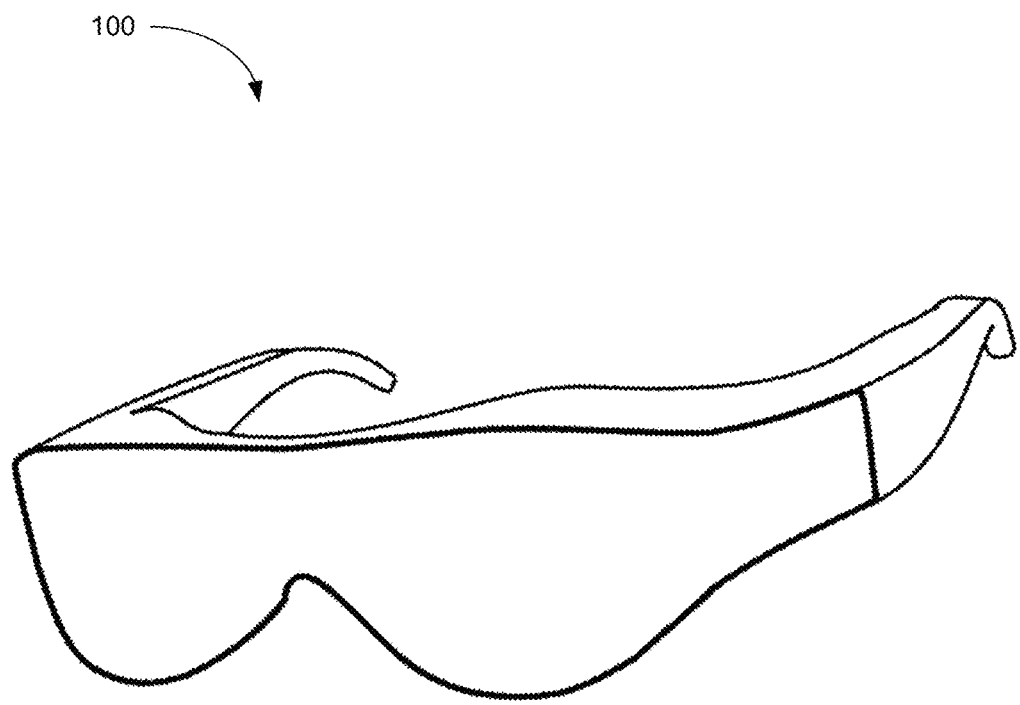
FIG. 1A is a perspective view of a display device in accordance with some embodiments.

Conventional head-mounted displays are larger and heavier than typical eyeglasses, because conventional head-mounted displays often include a complex set of optics that can be bulky and heavy. It is not easy for users to get used to wearing such large and heavy head-mounted displays.

Fresnel lenses, typically having multiple concentric annular sections that are offset from one another (e.g., for a circular lens), provide apertures and focal lengths comparable to conventional lenses. Because Fresnel lenses are typically thinner and lighter than conventional lenses of similar performance features (e.g., aperture and/or focal length), replacing conventional lenses in head-mounted displays with Fresnel lenses can reduce the size and weight of the head-mounted displays. However, Fresnel lenses suffer from diffractions and other optical artifacts associated with Fresnel structures, and thus, their use in imaging applications is limited.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first surface could be termed a second surface, and, similarly, a second surface could be termed a first surface, without departing from the scope of the various described embodiments. The first surface and the second surface are both surfaces, but they are not the same surfaces.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind."

FIG. 1A illustrates display device 100 in accordance with some embodiments. In some embodiments, display device 100 is configured to be worn on a head of a user (e.g., by having the form of spectacles or eyeglasses, as shown in FIG. 1A) or to be included as part of a helmet that is to be worn by the user. When display device 100 is configured to be worn on a head of a user or to be included as part of a helmet, display device 100 is called a head-mounted display. Alternatively, display device 100 is configured for placement in proximity of an eye or eyes of the user at a fixed location, without being head-mounted (e.g., display device 100 is mounted in a vehicle, such as a car or an airplane, for placement in front of an eye or eyes of the user).

In some embodiments, display device 100 includes one or more components described below with respect to FIG. 1B. In some embodiments, display device 100 includes additional components not shown in FIG. 1B.

Figure 1B:
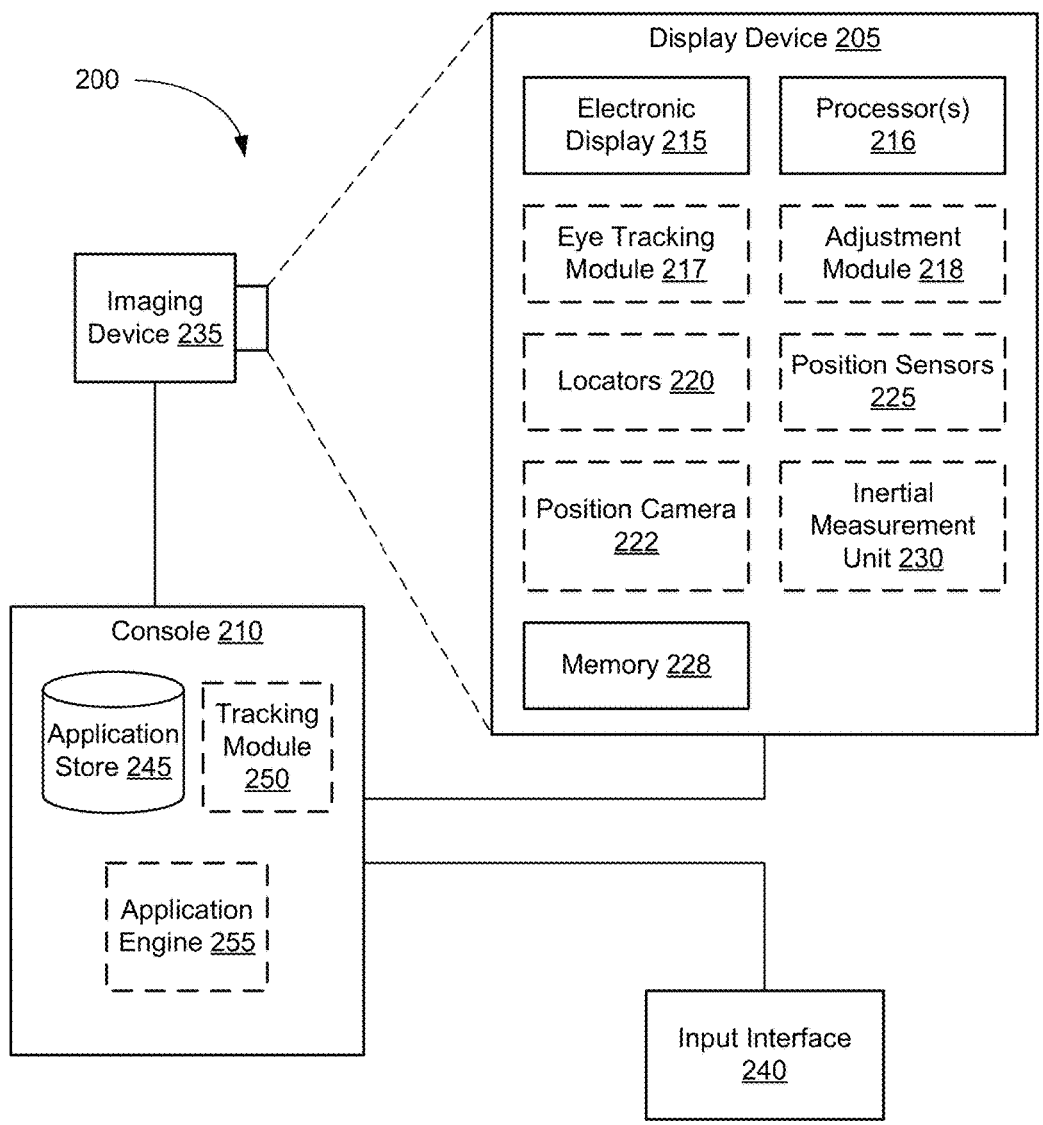
FIG. 1B is a block diagram of a system including a display device in accordance with some embodiments.

FIG. 1B is a block diagram of system 200 in accordance with some embodiments. The system 200 shown in FIG. 1B includes display device 205 (which corresponds to display device 100 shown in FIG. 1A), imaging device 235, and input interface 240 that are each coupled to console 210. While FIG. 1B shows an example of system 200 including one display device 205, imaging device 235, and input interface 240, in other embodiments, any number of these components may be included in system 200. For example, there may be multiple display devices 205 each having associated input interface 240 and being monitored by one or more imaging devices 235, with each display device 205, input interface 240, and imaging devices 235 communicating with console 210. In alternative configurations, different and/or additional components may be included in system 200. For example, in some embodiments, console 210 is connected via a network (e.g., the Internet) to system 200 or is self-contained as part of display device 205 (e.g., physically located inside display device 205). In some embodiments, display device 205 is used to create mixed reality by adding in a view of the real surroundings. Thus, display device 205 and system 200 described here can deliver virtual reality, mixed reality, and augmented reality.

In some embodiments, as shown in FIG. 1A, display device 205 is a head-mounted display that presents media to a user. Examples of media presented by display device 205 include one or more images, video, audio, or some combination thereof. In some embodiments, audio is presented via an external device (e.g., speakers and/or headphones) that receives audio information from display device 205, console 210, or both, and presents audio data based on the audio information. In some embodiments, display device 205 immerses a user in a virtual environment.

In some embodiments, display device 205 also acts as an augmented reality (AR) headset. In these embodiments, display device 205 augments views of a physical, real-world environment with computer-generated elements (e.g., images, video, sound, etc.). Moreover, in some embodiments, display device 205 is able to cycle between different types of operation. Thus, display device 205 may operate as a virtual reality (VR) device, an AR device, as glasses or as some combination thereof (e.g., glasses with no optical correction, glasses optically corrected for the user, sunglasses, or some combination thereof) based on instructions from application engine 255.

Display device 205 includes electronic display 215, one or more processors 216, eye tracking module 217, adjustment module 218, one or more locators 220, one or more position sensors 225, one or more position cameras 222, memory 228, inertial measurement unit (IMU) 230, or a subset or superset thereof (e.g., display device 205 with electronic display 215, one or more processors 216, and memory 228, without any other listed components). Some embodiments of display device 205 have different modules than those described here. Similarly, the functions can be distributed among the modules in a different manner than is described here.

One or more processors 216 (e.g., processing units or cores) execute instructions stored in memory 228. Memory 228 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 228, or alternately the non-volatile memory device(s) within memory 228, includes a non-transitory computer readable storage medium. In some embodiments, memory 228 or the computer readable storage medium of memory 228 stores programs, modules and data structures, and/or instructions for displaying one or more images on electronic display 215.

Electronic display 215 displays images to the user in accordance with data received from console 210 and/or processor(s) 216. In various embodiments, electronic display 215 may comprise a single adjustable electronic display element or multiple adjustable electronic displays elements (e.g., a display for each eye of a user).

In some embodiments, the display element includes one or more light emission devices and a corresponding array of emission intensity array. An emission intensity array is an array of electro-optic pixels, opto-electronic pixels, some other array of devices that dynamically adjust the amount of light transmitted by each device, or some combination thereof. These pixels are placed behind one or more lenses. In some embodiments, the emission intensity array is an array of liquid crystal based pixels in an LCD (a Liquid Crystal Display). Examples of the light emission devices include: an organic light emitting diode, an active-matrix organic light-emitting diode, a light emitting diode, a laser, a fluorescent light source, some type of device capable of being placed in a flexible display, or some combination thereof. The light emission devices include devices that are capable of generating visible light (e.g., red, green, blue, etc.) used for image generation. The emission intensity array is configured to selectively attenuate individual light emission devices, groups of light emission devices, or some combination thereof. Alternatively, when the light emission devices are configured to selectively attenuate individual emission devices and/or groups of light emission devices, the display element includes an array of such light emission devices without a separate emission intensity array.

One or more lenses direct light from the arrays of light emission devices (optionally through the emission intensity arrays) to locations within each eyebox and ultimately to the back of the user's retina(s). An eyebox is a region that is occupied by an eye of a user located proximity to display device 205 (e.g., a user wearing display device 205) for viewing images from display device 205. In some cases, the eyebox is represented as a 10 mm×10 mm square. In some embodiments, the one or more lenses include one or more coatings, such as anti-reflective coatings.

In some embodiments, the display element includes an infrared (IR) detector array that detects IR light that is retro-reflected from the retinas of a viewing user, from the surface of the corneas, lenses of the eyes, or some combination thereof. The IR detector array includes an IR sensor or a plurality of IR sensors that each correspond to a different position of a pupil of the viewing user's eye. In alternate embodiments, other eye tracking systems may also be employed.

Eye tracking module 217 determines locations of each pupil of a user's eyes. In some embodiments, eye tracking module 217 instructs electronic display 215 to illuminate the eyebox with IR light (e.g., via IR emission devices in the display element).

A portion of the emitted IR light will pass through the viewing user's pupil and be retro-reflected from the retina toward the IR detector array, which is used for determining the location of the pupil. Alternatively, the reflection off of the surfaces of the eye is also used to determine the location of the pupil. The IR detector array scans for retro-reflection and identifies which IR emission devices are active when retro-reflection is detected. Eye tracking module 217 may use a tracking lookup table and the identified IR emission devices to determine the pupil locations for each eye. The tracking lookup table maps received signals on the IR detector array to locations (corresponding to pupil locations) in each eyebox. In some embodiments, the tracking lookup table is generated via a calibration procedure (e.g., user looks at various known reference points in an image and eye tracking module 217 maps the locations of the user's pupil while looking at the reference points to corresponding signals received on the IR tracking array). As mentioned above, in some embodiments, system 200 may use other eye tracking systems than the embedded IR one described above.

Adjustment module 218 generates an image frame based on the determined locations of the pupils. In some embodiments, this sends a discrete image to the display that will tile subimages together, thus, a coherent stitched image will appear on the back of the retina. Adjustment module 218 adjusts an output (i.e. the generated image frame) of electronic display 215 based on the detected locations of the pupils. Adjustment module 218 instructs portions of electronic display 215 to pass image light to the determined locations of the pupils. In some embodiments, adjustment module 218 also instructs the electronic display not to pass image light to positions other than the determined locations of the pupils. Adjustment module 218 may, for example, block and/or stop light emission devices whose image light falls outside of the determined pupil locations, allow other light emission devices to emit image light that falls within the determined pupil locations, translate and/or rotate one or more display elements, dynamically adjust curvature and/or refractive power of one or more active lenses in the lens (e.g., microlens) arrays, or some combination thereof.

Optional locators 220 are objects located in specific positions on display device 205 relative to one another and relative to a specific reference point on display device 205. A locator 220 may be a light emitting diode (LED), a corner cube reflector, a reflective marker, a type of light source that contrasts with an environment in which display device 205 operates, or some combination thereof. In embodiments where locators 220 are active (i.e., an LED or other type of light emitting device), locators 220 may emit light in the visible band (e.g., about 400 nm to 750 nm), in the infrared band (e.g., about 750 nm to 1 mm), in the ultraviolet band (about 100 nm to 400 nm), some other portion of the electromagnetic spectrum, or some combination thereof.

In some embodiments, locators 220 are located beneath an outer surface of display device 205, which is transparent to the wavelengths of light emitted or reflected by locators 220 or is thin enough to not substantially attenuate the wavelengths of light emitted or reflected by locators 220. Additionally, in some embodiments, the outer surface or other portions of display device 205 are opaque in the visible band of wavelengths of light. Thus, locators 220 may emit light in the IR band under an outer surface that is transparent in the IR band but opaque in the visible band.

Inertial Measurement Unit (IMU) 230 is an electronic device that generates calibration data based on measurement signals received from one or more position sensors 225. Position sensor 225 generates one or more measurement signals in response to motion of display device 205. Examples of position sensors 225 include: one or more accelerometers, one or more gyroscopes, one or more magnetometers, another suitable type of sensor that detects motion, a type of sensor used for error correction of IMU 230, or some combination thereof. Position sensors 225 may be located external to IMU 230, internal to IMU 230, or some combination thereof.

Based on the one or more measurement signals from one or more position sensors 225, IMU 230 generates first calibration data indicating an estimated position of display device 205 relative to an initial position of display device 205. For example, position sensors 225 include multiple accelerometers to measure translational motion (forward/back, up/down, left/right) and multiple gyroscopes to measure rotational motion (e.g., pitch, yaw, roll). In some embodiments, IMU 230 samples the measurement signals and calculates the estimated position of display device 205 from the sampled data. For example, IMU 230 integrates the measurement signals received from the accelerometers over time to estimate a velocity vector and integrates the velocity vector over time to determine an estimated position of a reference point on display device 205. Alternatively, IMU 230 provides the sampled measurement signals to console 210, which determines the first calibration data. The reference point is a point that may be used to describe the position of display device 205. While the reference point may generally be defined as a point in space, in practice the reference point is defined as a point within display device 205 (e.g., a center of IMU 230).

In some embodiments, IMU 230 receives one or more calibration parameters from console 210. As further discussed below, the one or more calibration parameters are used to maintain tracking of display device 205. Based on a received calibration parameter, IMU 230 may adjust one or more IMU parameters (e.g., sample rate). In some embodiments, certain calibration parameters cause IMU 230 to update an initial position of the reference point so that it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

Imaging device 235 generates calibration data in accordance with calibration parameters received from console 210. Calibration data includes one or more images showing observed positions of locators 220 that are detectable by imaging device 235. In some embodiments, imaging device 235 includes one or more still cameras, one or more video cameras, any other device capable of capturing images including one or more locators 220, or some combination thereof. Additionally, imaging device 235 may include one or more filters (e.g., used to increase signal to noise ratio). Optionally, imaging device 235 is configured to detect light emitted or reflected from locators 220 in a field of view of imaging device 235. In embodiments where locators 220 include passive elements (e.g., a retroreflector), imaging device 235 may include a light source that illuminates some or all of locators 220, which retro-reflect the light towards the light source in imaging device 235. Second calibration data is communicated from imaging device 235 to console 210, and imaging device 235 receives one or more calibration parameters from console 210 to adjust one or more imaging parameters (e.g., focal length, focus, frame rate, ISO, sensor temperature, shutter speed, aperture, etc.).

Input interface 240 is a device that allows a user to send action requests to console 210. An action request is a request to perform a particular action. For example, an action request may be to start or end an application or to perform a particular action within the application. Input interface 240 may include one or more input devices. Example input devices include: a keyboard, a mouse, a game controller, a touch controller, data from brain signals, data from other parts of the human body, or any other suitable device for receiving action requests and communicating the received action requests to console 210. An action request received by input interface 240 is communicated to console 210, which performs an action corresponding to the action request. In some embodiments, input interface 240 may provide haptic feedback to the user in accordance with instructions received from console 210. For example, haptic feedback is provided when an action request is received, or console 210 communicates instructions to input interface 240 causing input interface 240 to generate haptic feedback when console 210 performs an action.

Console 210 provides media to display device 205 for presentation to the user in accordance with information received from one or more of: imaging device 235, display device 205, and input interface 240. In the example shown in FIG. 1B, console 210 includes application store 245, tracking module 250, and application engine 255. Some embodiments of console 210 have different modules than those described in conjunction with FIG. 1B. Similarly, the functions further described below may be distributed among components of console 210 in a different manner than is described here.

When application store 245 is included in console 210, application store 245 stores one or more applications for execution by console 210. An application is a group of instructions, that when executed by a processor, is used for generating content for presentation to the user. Content generated by the processor based on an application may be in response to inputs received from the user via movement of display device 205 or input interface 240. Examples of applications include: gaming applications, conferencing applications, educational applications, video playback application, or other suitable applications.

When tracking module 250 is included in console 210, tracking module 250 calibrates system 200 using one or more calibration parameters and may adjust one or more calibration parameters to reduce error in determination of the position of display device 205. For example, tracking module 250 adjusts the focus of imaging device 235 to obtain a more accurate position for observed locators on display device 205. Moreover, calibration performed by tracking module 250 also accounts for information received from IMU 230. Additionally, if tracking of display device 205 is lost (e.g., imaging device 235 loses line of sight of at least a threshold number of locators 220), tracking module 250 re-calibrates some or all of system 200.

In some embodiments, tracking module 250 tracks movements of display device 205 using second calibration data from imaging device 235. For example, tracking module 250 determines positions of a reference point of display device 205 using observed locators from the second calibration data and a model of display device 205. In some embodiments, tracking module 250 also determines positions of a reference point of display device 205 using position information from the first calibration data. Additionally, in some embodiments, tracking module 250 may use portions of the first calibration data, the second calibration data, or some combination thereof, to predict a future location of display device 205. Tracking module 250 provides the estimated or predicted future position of display device 205 to application engine 255.

Application engine 255 executes applications within system 200 and receives position information, acceleration information, velocity information, predicted future positions, or some combination thereof of display device 205 from tracking module 250. Based on the received information, application engine 255 determines content to provide to display device 205 for presentation to the user. For example, if the received information indicates that the user has looked to the left, application engine 255 generates content for display device 205 that mirrors the user's movement in a virtual environment. Additionally, application engine 255 performs an action within an application executing on console 210 in response to an action request received from input interface 240 and provides feedback to the user that the action was performed. The provided feedback may be visual or audible feedback via display device 205 or haptic feedback via input interface 240.

Figure 1C:
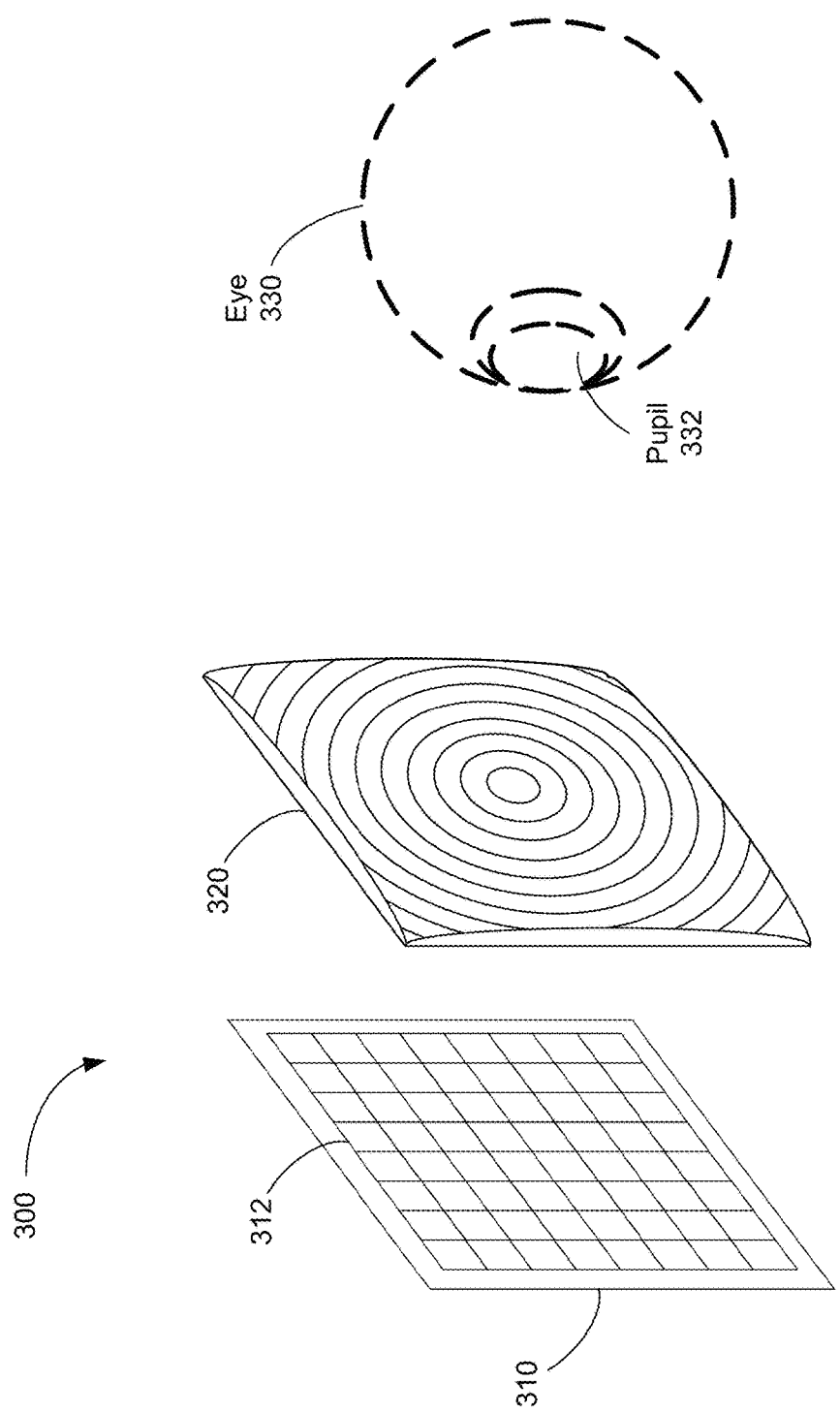
FIG. 1C is an isometric view of a display device in accordance with some embodiments.

FIG. 1C is an isometric view of display device 300 in accordance with some embodiments. In some other embodiments, display device 300 is part of some other electronic display (e.g., digital microscope, etc.). In some embodiments, display device 300 includes light emission device array 310 and one or more lenses (e.g., lens 320). In some embodiments, display device 300 also includes an emission intensity array and an IR detector array.

Light emission device array 310 emits image light and optional IR light toward the viewing user. Light emission device array 310 may be, e.g., an array of LEDs, an array of microLEDs, an array of OLEDs, or some combination thereof. Light emission device array 310 includes light emission devices 312 that emit visible light (and optionally includes devices that emit IR light).

The emission intensity array is configured to selectively attenuate light emitted from light emission array 310. In some embodiments, the emission intensity array is composed of a plurality of liquid crystal cells or pixels, groups of light emission devices, or some combination thereof. Each of the liquid crystal cells is, or in some embodiments, groups of liquid crystal cells are, addressable to have specific levels of attenuation. For example, at a given time, some of the liquid crystal cells may be set to no attenuation, while other liquid crystal cells may be set to maximum attenuation. In this manner the emission intensity array is able to control what portion of the image light emitted from light emission device array 310 is passed to the one or more lenses (e.g., lens 320). In some embodiments, display device 300 uses the emission intensity array to facilitate providing image light to a location of pupil 332 of eye 330 of a user, and minimize the amount of image light provided to other areas in the eyebox.

In FIG. 1C, one or more lenses (e.g., lens 320) receive the modified image light (e.g., attenuated light) from the emission intensity array (or directly from emission device array 310), and directs the modified image light to a location of pupil 332. Lens 320 includes one or more diffractive optics. In some embodiments, lens 320 includes a Fresnel lens, described below with respect to FIGS. 4E and 5D.

An optional IR detector array detects IR light that has been retro-reflected from the retina of eye 330, a cornea of eye 330, a crystalline lens of eye 330, or some combination thereof. The IR detector array includes either a single IR sensor or a plurality of IR sensitive detectors (e.g., photodiodes). In some embodiments, the IR detector array is separate from light emission device array 310. In some embodiments, the IR detector array is integrated into light emission device array 310.

In some embodiments, light emission device array 310 and the emission intensity array make up a display element. Alternatively, the display element includes light emission device array 310 (e.g., when light emission device array 310 includes individually adjustable pixels) without the emission intensity array. In some embodiments, the display element additionally includes the IR array. In some embodiments, in response to a determined location of pupil 332, the display element adjusts the emitted image light such that the light output by the display element is refracted by one or more lenses (e.g., lens 320) toward the determined location of pupil 332, and not toward other locations in the eyebox.

Figure 2A:
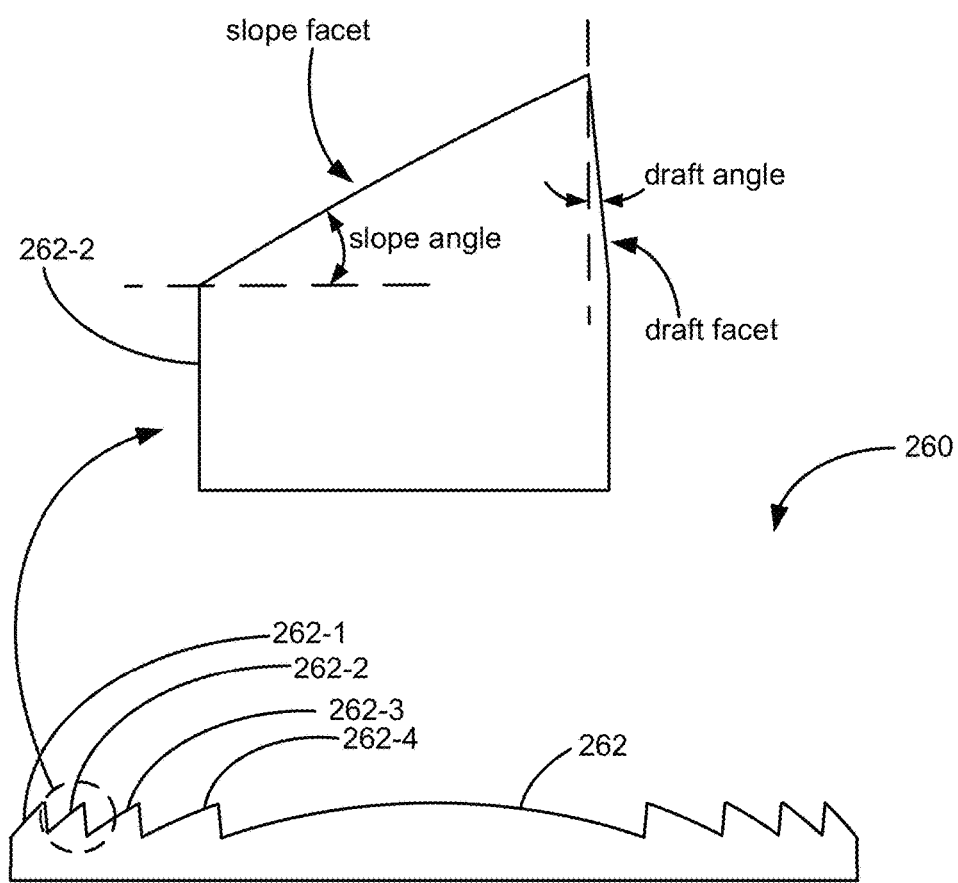
FIG. 2A illustrates a cross-section of a conventional Fresnel lens in accordance with some embodiments.

FIG. 2A illustrates a cross-section of conventional Fresnel lens 260 in accordance with some embodiments. In some embodiments, a Fresnel lens, such as conventional Fresnel lens 260, includes Fresnel surface 262 including a plurality of Fresnel structures (e.g., a plurality of Fresnel structures 262-1, 262-2, 262-3, and 262-4). As shown in FIG. 2A, each Fresnel structure (e.g., Fresnel structure 262-2) has a slope facet and a draft facet. In conventional Fresnel lens 260, the slope facet and the draft facet are both smooth lens surfaces (i.e., the lens surfaces are not textured or patterned). The draft facet is characterized by a representative draft angle (e.g., the draft facet is tilted by the representative draft angle from a reference axis). In some embodiments, the draft facet is a flat surface. In some embodiments, the draft facet is a curved surface, and the representative draft angle is an average draft angle for the draft facet. In some embodiments, the slope facet is characterized by a representative slope angle (e.g., the slope facet is tilted by the representative slope angle from the reference axis). In some embodiments, the slope facet is a flat surface. In some embodiments, the slope facet is a curved surface, and the representative slope angle is an average slope angle for the slope facet.

Figure 2B:
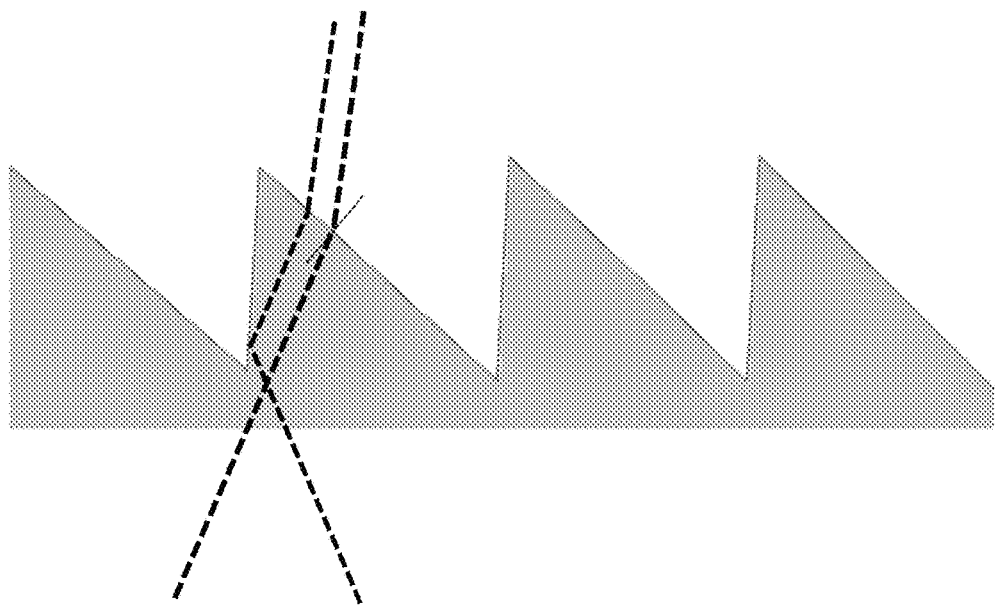
FIGS. 2B and 2C illustrate interaction between incoming light and a draft facet of a Fresnel lens in accordance with some embodiments.
Figure 2C:
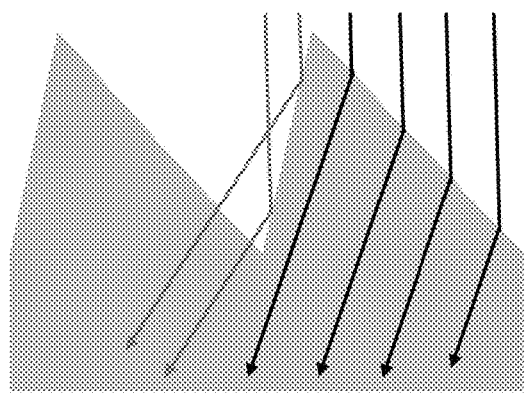

FIGS. 2B and 2C illustrate interaction between incoming light and a draft facet of a Fresnel lens in accordance with some embodiments.

FIG. 2B illustrates that incoming light is refracted on a slope facet of a Fresnel structure. A portion of the light refracted on the slope facet impinges on the internal surface of the draft facet of the Fresnel structure, and a portion of the light impinging on the draft facet is reflected by the draft facet (e.g., by total internal reflection), which increases stray light. FIG. 2C illustrates that incoming light may also be impinging on the draft facet of a Fresnel structure, and be reflected. A portion of the reflected light enters through the slope facet of an adjacent Fresnel structure, which also increases stray light. As shown in FIGS. 2B and 2C, interaction between incoming light and a draft facet increases stray light, thereby increasing optical artifacts. Such optical artifacts are reduced by using a Fresnel surface with textured draft facets, as shown in FIG. 2D.

Figure 2D:
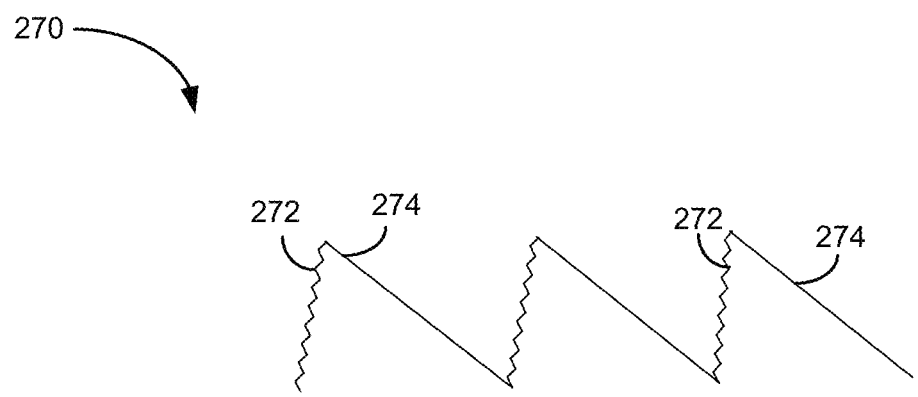
FIG. 2D illustrates a Fresnel pattern with textured draft facets in accordance with some embodiments.

FIG. 2D illustrates Fresnel pattern 270 with textured draft facets 272 in accordance with some embodiments. Fresnel pattern 270 has a plurality of Fresnel structures with textured draft facets 272 and a plurality of corresponding slope facets 274. Light impinging on textured draft surfaces 272 is diffused. The diffusion decreases stray light arising from the interaction of light with draft facets, as illustrated above with respect to FIGS. 2B and 2C, thereby decreasing optical artifacts.

Figure 3A:
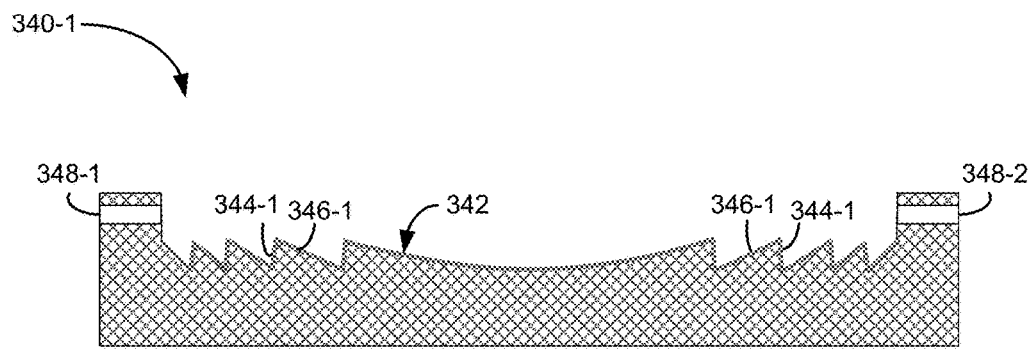
FIG. 3A is a schematic diagram illustrating a cross-sectional view of a die block for molding a Fresnel lens in accordance with some embodiments.
Figure 3B:
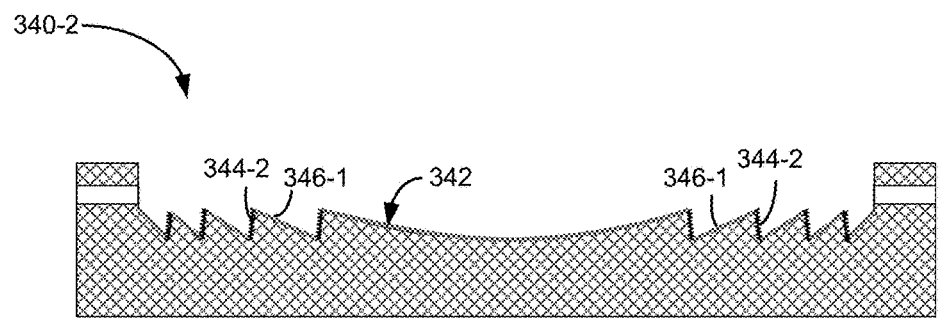
FIG. 3B is a schematic diagram illustrating a cross-sectional view of the die block of FIG. 3A with textured draft facets in accordance with some embodiments.
Figure 3C:
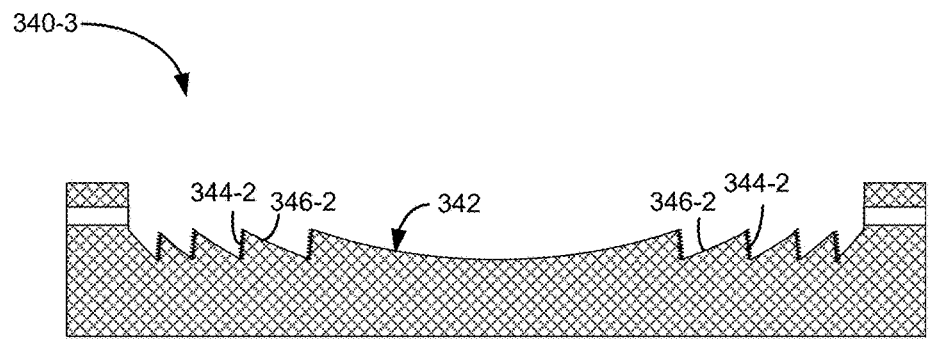
FIG. 3C is a schematic diagram illustrating a cross-sectional view of the die block of FIG. 3B with smoothed slope facets in accordance with some embodiments.

FIGS. 3A-3C are schematic diagrams illustrating a method of making a die block for molding a Fresnel lens with textured draft facets in accordance with some embodiments. FIG. 3A is a schematic diagram illustrating a cross-sectional view of die block 340-1 for molding a Fresnel lens in accordance with some embodiments. Die block 340-1 is made of metal (e.g., aluminum or steel). In some embodiments, die block 340-1 is made of other material (e.g., ceramic). In some embodiments surface 342 of die block 340-1 is plated with a nickel phosphor coating. In some embodiments, the nickel phosphor coating has a thickness ranging from 0.5 mm to 1.0 mm. Die block 340-1 is machined by precision-machining techniques known in the art (e.g., precision computer numerical control (CNC) machining, electrical discharge machining (EDM), electrochemical erosion, and/or laser cutting or water jet cutting), to include surface 342. In some embodiments, the precision-machining is performed by a Single Point Diamond Turning (SPDT) machine. Surface 342 has a pattern corresponding to a surface of a Fresnel lens, such as surface 262 of Fresnel lens 260 described above with respect to FIG. 2A. Surface 342 includes a plurality of draft facets 344-1 and a plurality of corresponding slope facets 346-1. Die block 340-1 can be used for molding Fresnel lenses by injection molding or compression molding. Die block 340-1 also optionally includes one or more inlets (e.g., inlets 348-1 and 348-2) for insertion of a molding material used for molding a lens.

In order to mold a Fresnel lens with textured draft facets, surface 342 of die block 340-1 is further processed to add textures to draft facets of surface 342. FIG. 3B is a schematic diagram illustrating a cross-sectional view of die block 340-2 with textured draft facets 344-2 in accordance with some embodiments. In some embodiments, the addition of textures is performed using one or more techniques known in the art, which are different from the precision-machining techniques used for making die surface 342, described above with respect to FIG. 3A. In some embodiments, adding textures includes increasing a roughness of draft facets 344-2. In some embodiments, textures are added to all draft facets 344-2 of surface 342. In some embodiments, textures are added to a portion of draft facets 344-2. In some embodiments, textured draft facets 344-2 are textured by sanding. In some embodiments, textured draft facets 344-2 are textured by forming markings with a cutting tool (e.g., by a diamond cutting tool). In some embodiments, a roughness average (Ra) of the surface roughness of textured draft facets 344-2 is 50 nm or more. In some embodiments, the roughness average of the surface roughness of textured draft facets 344-2 is between 50 and 76 nm. In some embodiments, the roughness average of the surface roughness of textured draft facets 344-2 is between 50 and 6000 nm. In some embodiments, the roughness average the surface roughness of textured draft facets 344-2 is less than 6000 nm. In some embodiments, the roughness average of the surface roughness of textured draft facets 344-2 is between 4810 and 5824 nm.

In order to mold a Fresnel lens with good optical performance, subsequent to adding texture to draft facets 344-2, die block 340-2 is further processed to smooth slope facets 346-1 and/or other portions of surface 342 excluding portions of surface 342 that include textured draft facets 344-2. FIG. 3C is a schematic diagram illustrating a cross-sectional view of die block 340-3 with textured draft facets 344-2 and smoothed slope facets 346-2 in accordance with some embodiments. In some embodiments, the smoothing includes polishing slope facets 346-2 and/or other portions of surface 342, excluding portions of surface 342 that include textured draft facets 344-2. In some embodiments, smoothed slope facets 346-2 have a surface roughness less than or equal to 5 nm, which is less than the surface roughness of draft facets 344-2. Die block 340-3 is configured to be used to mold a Fresnel lens with high optical performance and decreased optical artifacts. A method of making a Fresnel lens with textured draft facets using die block 340-3 of FIG. 3C will be illustrated in FIGS. 4A-4D.

Figure 4A:
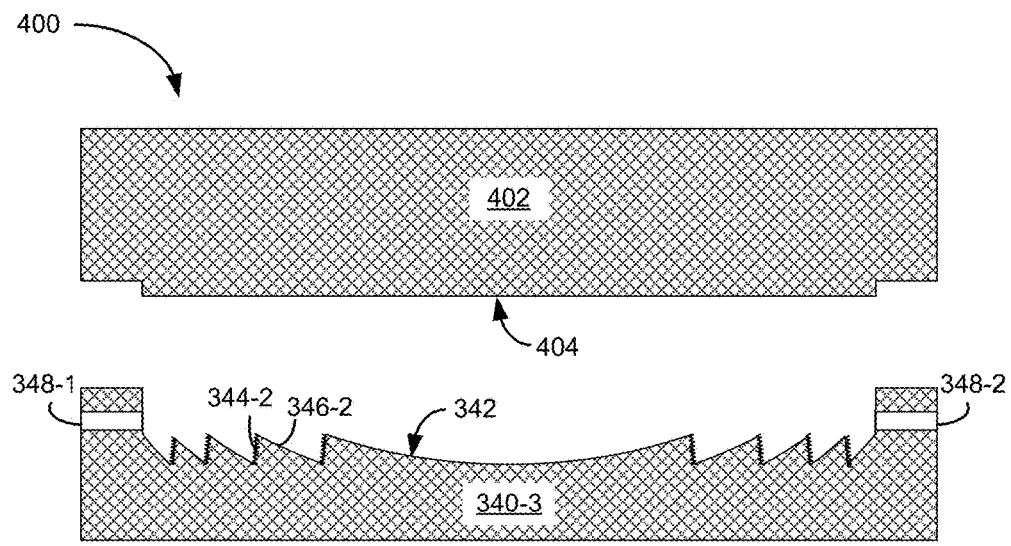
FIG. 4A is a schematic diagram illustrating a cross-sectional view of a molding system in accordance with some embodiments.

FIG. 4A is a schematic diagram illustrating a cross-sectional view of molding system 400 in an uncoupled configuration in accordance with some embodiments. Molding system 400 includes die block 340-3 described above with respect to FIG. 3B, and die block 402. Die block 402 is vertically aligned with die block 340-3. Die block 402 is also made of metal (e.g., aluminum or steel). Die block 402 has surface 404 facing surface 342 of die block 340-3. In FIG. 4A, surface 404 is flat. In some embodiments, surface 404 or a portion of surface 404 has a non-flat shape, e.g., a concave, a convex, a spherical, or an aspherical shape.

Figure 4B:
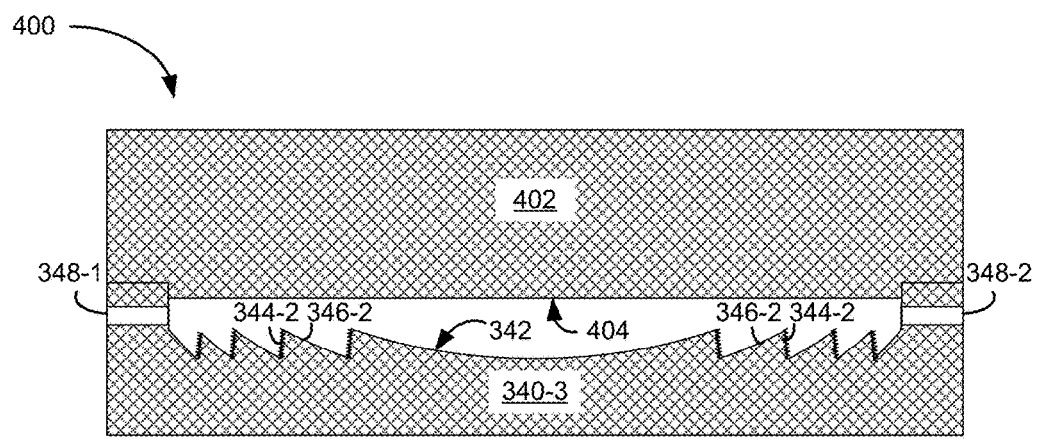
FIG. 4B is a schematic diagram illustrating a cross-sectional view of the molding system of FIG. 4A in a coupled configuration in accordance with some embodiments.
Figure 4C:
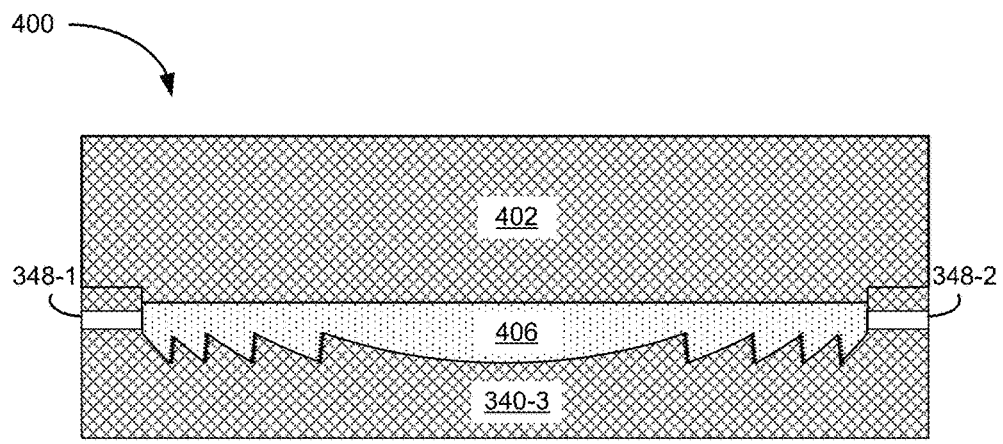
FIG. 4C is a schematic diagram illustrating a cross-sectional view of the molding system with a molding material in accordance with some embodiments.

FIG. 4B is a schematic diagram illustrating a cross-sectional view of molding system 400 in a coupled configuration in accordance with some embodiments. When coupled, a space is formed between die blocks 402 and 340-3 for inserting a liquid material used for making a Fresnel lens by injection molding or by compression molding. The space is defined by surface 404 of die block 402 and surface 342 of die block 340-3. The space defined by surface 404 and surface 342 is filled by a molding material through inlets 348-1 and/or 348-2 for forming a Fresnel lens. FIG. 4C is a schematic diagram illustrating a cross-sectional view of molding system 400 filled with molding material 406 in accordance with some embodiments. In some embodiments, molding material 406 includes one or more liquids and/or one or more gels used for forming optically transparent substrates by curing. In some embodiments, such optically transparent substrates include glass, such as N-BK7, N-SF11, or F2; barium borate; barium fluoride; magnesium fluoride; sapphire; calcium fluoride; fused silica; calcite; or a plastic, such as polymethyl methacrylate (PMMA) or polycarbonate; etc. In some embodiments, molding material 406 further includes one or more additional chemical components (e.g., one or more of fillers, hardeners, chemical activators, etc.). In some embodiments, molding material 406 and/or die blocks 402 and 340-3 are heated while molding. In some embodiments, a high pressure and compression force is applied to molding system 400 while molding. In order to harden a Fresnel lens, molding material 406 is cured. In some embodiments, the curing process includes temperature-induced curing, ultraviolet (UV) curing, electron-beam induced curing, curing induced by chemical additives, or some combination thereof. In some embodiments, the temperature-induced curing includes cooling. After curing, a high precision Fresnel lens is formed. In some embodiments, steps described with respect to FIGS. 4A-4C are performed in a different order. For example, molding material 406 is added on die block 340-3 (FIG. 4C) while molding system 400 is in an open configuration (FIG. 4A), after which molding system 400 is closed (FIG. 4B).

Figure 4D:
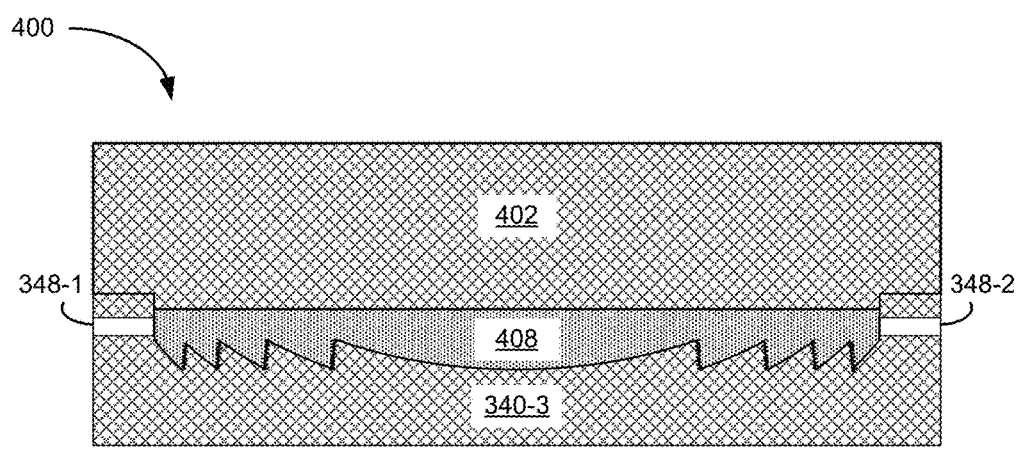
FIG. 4D is a schematic diagram illustrating a cross-sectional view of the molding system with a Fresnel lens in accordance with some embodiments.

FIG. 4D is a schematic diagram illustrating a cross-sectional view of molding system 400 with Fresnel lens 408 in accordance with some embodiments.

Figure 4E:
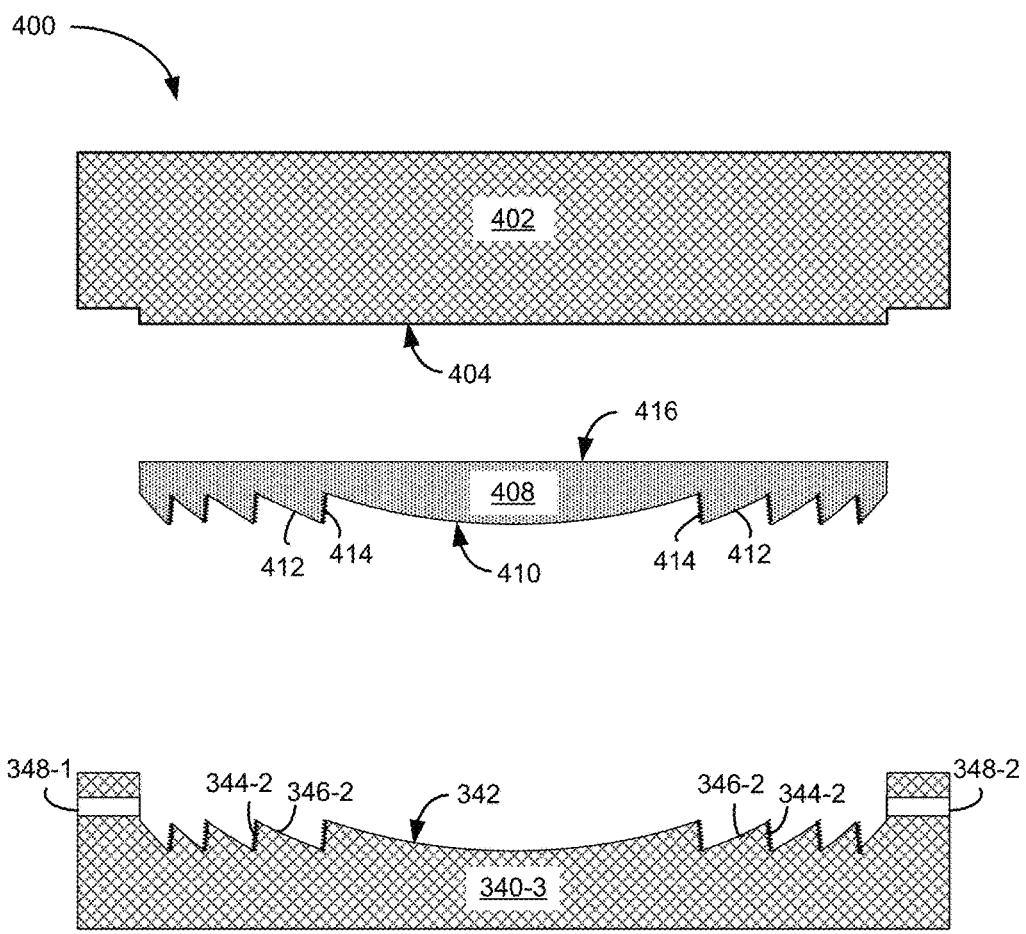
FIG. 4E is a schematic diagram illustrating a cross-sectional view of the molding system with a removed Fresnel lens in accordance with some embodiments.

After the curing process, Fresnel lens 408 is removed from molding system 400. FIG. 4E is a schematic diagram illustrating a cross-sectional view of molding system 400 with removed Fresnel lens 408 in accordance with some embodiments. Fresnel lens 408 includes surface 410, which is a Fresnel patterned surface corresponding to surface 342 of die block 340-3. Surface 410 includes a plurality of Fresnel structures defined by draft facets 414 and slope facets 412. Draft facets 414 correspond to textured draft facets 344-2, described above with respect to FIG. 3B. In some embodiments, a roughness average (Ra) of the surface roughness of textured draft facets 414 is 50 nm or more. In some embodiments, the roughness average of the surface roughness of textured draft facets 344-2 is between 50 and 76 nm. In some embodiments, the roughness average of the surface roughness of textured draft facets 414 is between 50 and 6000 nm. In some embodiments, the roughness average of the surface roughness of textured draft facets 414 is less than 6000 nm. In some embodiments, the roughness average of the surface roughness of textured draft facets 344-2 is between 4810 and 5824 nm. Slope facets 412 correspond to smoothed slope facets 346-2 described above with respect to FIG. 3C. In some embodiments, slope facets 412 have a surface roughness less than or equal to 5 nm, which is less than the surface roughness of draft facets 414. Fresnel lens 408 also includes surface 416 opposite to surface 410 and corresponding to surface 404 of die block 402. In FIG. 4E, surface 416 is a flat surface. In some embodiments, surface 416 can be a concave, convex, spherical, or an aspherical surface.

Figure 5A:
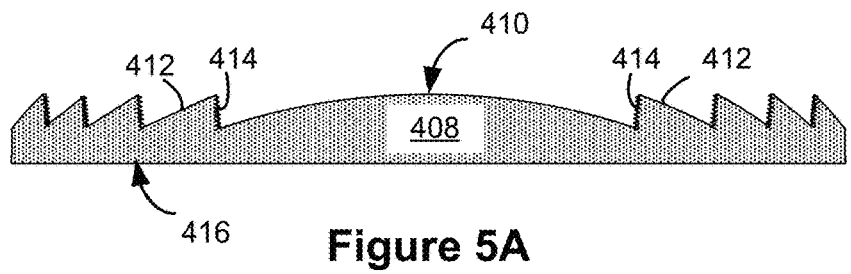
FIGS. 5A-5D are schematic diagrams illustrating a method of coating the textured draft facets with a masking material in accordance with some embodiments.
Figure 5B:
Figure 5C:
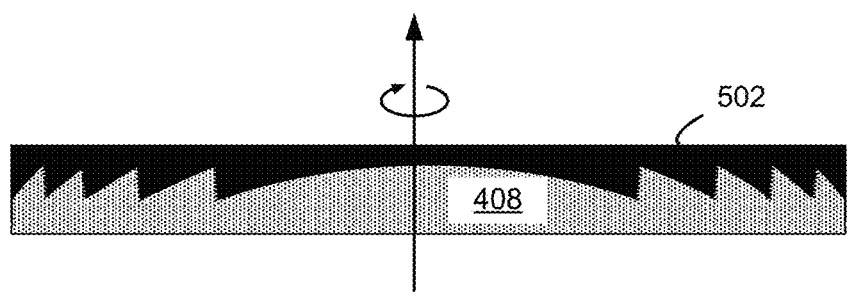
Figure 5D:
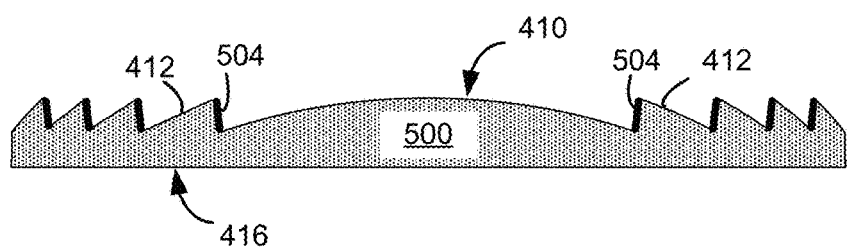

In some embodiments, Fresnel lens 408 is further processed by adding a coating on draft facets 414 of surface 410. FIGS. 5A-5B are schematic diagrams illustrating a method of coating textured draft facets 414 with a masking material in accordance with some embodiments. In some embodiments, the masking material reduces or prevents transmission of at least visible light interacting with draft facets, thereby further reducing optical artifacts. In FIG. 5A, Fresnel lens 408 is positioned such that surface 410 has a plurality of Fresnel structures facing up and surface 416 is facing down. In FIG. 5D, a layer of masking material 502 is added on top of surface 410. In some embodiments, masking material 502 is an absorptive material (e.g., a paint). An absorptive coating further decreases the artifacts arising from light interacting with draft facets 414 by absorbing such light. In some embodiments, masking material 502 is black paint. After adding masking material 502, Fresnel lens 408 is spun (e.g., on a spin coater), as illustrated in FIG. 5C. The spinning spreads out masking material 502 in order to form a thin film. Because masking material 502 has an increased adhesion to textured surfaces with an increased surface roughness compared to smoothed surfaces with a low surface roughness, masking material 502 adheres to and thereby remains on textured surfaces of draft facets 414 whereas it does not adhere to and thereby forgoes remaining on smoothed surfaces (e.g., slope facets 412). The spinning time, speed, volume of masking material 502, properties of masking material 502 (e.g., viscosity, or density), and/or other spinning parameters (e.g., temperature, humidity etc.) can be adjusted to achieve an optimal coating of masking material remaining on draft facets 414 without remaining on slope facets 412.

FIG. 5D illustrates Fresnel lens 500 with coated draft facets 504. In some embodiments, all draft facets 504 of the plurality of draft facets are coated with masking material 502. In some embodiments, at least a portion of the plurality of draft facets 504 are coated with masking material 502 (e.g., at least 10%, at least 20%, at least 30%, at least 40%, at least 50%, at least 60%, at least 70%, at least 80% or at least 90%. In some embodiments, at least 90% of the plurality of slope facets 412 is not covered by masking material 502. In some embodiments, the method of adding masking material 502 on draft facets 504 further includes curing of masking material 502 (e.g., by temperature-induced curing, or by UV curing). In some embodiments, the method further includes curing masking material 502 while at least a portion of the plurality of slope facets 412 is not coated by the masking material 502.

In light of these principles, we now turn to certain embodiments.

In accordance with some embodiments, a method for preparing a die for molding of a Fresnel lens includes obtaining a first die block that defines at least one or more portions a Fresnel lens. The one or more portions defined in the first die block correspond to a plurality of slope facets and a plurality of draft facets. The method also includes adding textures to one or more portions of the first die block that correspond to at least a portion of the plurality of draft facets. For example, FIGS. 3A-3C illustrate a method of preparing die block 340-3 for molding a Fresnel lens. In FIG. 3A, die block 340-1 is obtained. Die block 340-1 includes surface 342 with a plurality of Fresnel structures, including a plurality of draft facets 344-1 and a plurality of corresponding slope facets 346-1. In FIG. 3B, texture is added to the plurality of draft facets 344-1 to form a plurality of textured draft facets 344-2 of die block 340-2. Surface 342 defines a surface of a Fresnel lens (e.g., surface 262 of Fresnel lens 206 described above with respect to FIG. 2A).

In some embodiments, one or more portions of the first die block that correspond to the plurality of slope facets have a first die surface roughness (e.g., slope facet 346-2 has a first die surface roughness in FIG. 3C), and the one or more portions of the first die block that correspond to at least a portion of the plurality of draft facets have a second die surface roughness (e.g., draft facet 344-2 has a second die surface roughness in FIG. 3C) that is greater than the first die surface roughness.

In some embodiments, a roughness average of the second die surface is 50 nm or more (e.g., the roughness average of draft facets 344-2 is 50 nm or more in FIG. 3C). In some embodiments, the roughness average of the second die surface is between 50 and 76 nm. In some embodiments, the roughness average of the second die surface is between 50 and 6000 nm. In some embodiments, the roughness average of the second die surface is less than 6000 nm. In some embodiments, the roughness average of the second die surface is between 4810 and 5824 nm.

In some embodiments, adding textures to the one or more portions of the first die block includes increasing a roughness of the one or more portions of the first die block that correspond to at least a portion of the plurality of draft facets (e.g., adding textures to the plurality of draft facets 344-2 in FIG. 3B includes increasing the roughness of draft facets 344-2).

In some embodiments, adding textures to the one or more portions of the first die block includes sanding the one or more portions of the first die block that correspond to at least a portion of the plurality of draft facets (e.g., the plurality of draft facets 344-2 in FIG. 3B is sanded).

In some embodiments, adding textures to the one or more portions of the first die block includes forming, with a cutting tool, markings on a surface of the one or more portions of the first die block that correspond to at least a portion of the plurality of draft facets (e.g., the plurality of draft facets 344-2 in FIG. 3B has markings formed by a cutting tool). In some embodiments, the cutting tool is a diamond tool.

In some embodiments, the method further includes smoothing one or more portions of the first die block that correspond to at least a portion of the plurality of slope facets (e.g., a plurality of slope facets 346-2 and/or other portions of surface 342 of die block 340-3, excluding the plurality of draft facets 344-2, is smoothed in FIG. 3C).

In some embodiments, smoothing the one or more portions of the first die block includes polishing the one or more portions of the first die block (e.g., a plurality of slope facets 346-2 and/or other portions of surface 342 of die block 340-3, excluding the plurality of draft facets 344-2, is polished in FIG. 3C).

In some embodiments, the one or more portions of the first die block that correspond to at least a portion of the plurality of slope facets are smoothed subsequent to adding textures to one or more portions of the first die block that correspond to at least a portion of the plurality of draft facets. For example, a plurality of slope facets 346-2 and/or other portions of surface 342, excluding the plurality of draft facets 344-2, is smoothed in FIG. 3C, subsequent to adding textures to draft facets 344-2 in FIG. 3B.

In accordance with some embodiments, a die block is made by the method described above. For example, die block 340-3 in FIG. 3C has been made by a method described above. Die block 340-3 has surface 342 with a plurality of Fresnel structures defining a surface of a Fresnel lens (e.g., surface 410 of Fresnel lens 408 in FIG. 4E). Draft facets 344-2 of surface 342 are textured and slope facets 346-2 are smoothed.

In accordance with some embodiments, a method of making a Fresnel lens includes obtaining the first die block describe above and obtaining a second die block. The second die block is distinct and separate from the first die block. The method includes coupling the first die block and the second die block, and providing a molding material into a space defined between the first die block and the second die block. The method further includes curing the molding material located between the first die block and the second die block to form a Fresnel lens, and removing the Fresnel lens from the first die block and/or the second die block. For example, a method of making Fresnel lens 408 by molding system 400 is illustrated in FIGS. 4A-4E. In FIG. 4A, molding system 400 includes die block 340-3 and die block 402. Die block 402 is distinct and separate from die block 340-3. In FIG. 4B, die block 340-3 and die block 402 are coupled. In FIG. 4C, molding material 406 is added to a space defined by surface 342 of die block 340-3 and surface 404 of die block 402. Molding material 406 is cured to form Fresnel lens 408 in FIG. 4D. In some embodiments, the curing includes cooling. In FIG. 4E, Fresnel lens 408 is removed from molding system 400.

In some embodiments, the Fresnel lens includes a plurality of slope facets and a plurality of draft facets (e.g., Fresnel lens 408 of FIG. 4E includes a plurality of slope facets 412 and a plurality of draft facets 414), and the method of making a Fresnel lens includes coating at least a portion of the plurality of draft facets of the Fresnel lens with a masking material. In some embodiments, the masking material reduces or prevents transmission of at least visible light interacting with draft facets. For example, a method of coating at least a portion of draft facets 414 of Fresnel lens 408 is illustrated in FIGS. 5A-5C. In FIG. 5A, Fresnel lens 408 is positioned such that surface 410 is facing up. In FIG. 5B, a layer of masking material 502 is added on top of surface 410. In FIG. 5C, Fresnel lens 408 is spun (e.g., by a spin coating device), thereby forming a coating of masking material 502 remaining on the plurality of draft facets 414 and forgoing remaining on the plurality of slope facets 412. In FIG. 5D, draft facets 504 are coated with masking material 502.

In some embodiments, the masking material includes black paint (e.g., masking material 502 in FIG. 5B is black paint).

In some embodiments, coating at least a portion of the plurality of draft facets of the Fresnel lens with the masking material includes coating at least the portion of the plurality of draft facets of the Fresnel lens with the masking material without coating the plurality of slope facets with the masking material (e.g., draft facets 412 are coated with masking material 502 and slope facets 412 are not coated with masking material 502 in FIG. 5D).

In some embodiments, the Fresnel lens includes a first surface that includes the plurality of slope facets and the plurality of draft facets and a second surface that is opposite to the first surface. Coating at least a portion of the plurality of draft facets of the Fresnel lens with the masking material includes spin coating the first surface with the masking material. For example, Fresnel lens 500 includes surface 410 with a plurality of draft facets 504 coated with masking material 502 and a plurality of slope facets 412. Fresnel lens 500 also includes surface 416 opposite to surface 410.

In some embodiments, spin coating the first surface with the masking material causes the masking material to remain on at least the coated portion of the plurality of draft facets and forgo remaining on at least a portion of the plurality of slope facets. For example, the spin coating illustrated in FIG. 5C causes masking material 502 to remain on at least a portion of draft facets 504 and forgoes remaining on at least a portion of slope facets 412.

In some embodiments, at least 90% of the plurality of slope facets is not covered by the masking material (e.g., at least 90% of slope facets 412 is not covered by masking material 502 in FIG. 5D). In some embodiments, the method includes curing the masking material while at least a portion of the plurality of slope facets is not coated by the masking material.

In accordance with some embodiments, a Fresnel lens is made by the method described above (e.g., Fresnel lens 408 in FIG. 4E).

In some embodiments, the lens includes a plurality of slope facets having a first lens surface roughness and a plurality of draft facets having a second lens surface roughness that is greater than the first lens surface roughness. For example, Fresnel lens 408 includes a plurality of draft facets 414 having surface roughness greater than the surface roughness of a plurality of slope facets 412 in FIG. 4E.

In some embodiments, the plurality of draft facets is coated with a masking material and the plurality of slope facets is not coated with the masking material. For example, a plurality of draft facets 504 is coated with masking material 502 and a plurality of slope facets 412 is not coated with masking material 502 in FIG. 5D.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method for preparing a die for molding a Fresnel lens, the method comprising:
   obtaining a first die block that defines at least one or more portions of a Fresnel lens, the one or more portions defined in the first die block corresponding to a plurality of slope facets and a plurality of draft facets;
   adding textures to one or more portions of the first die block that correspond to at least a portion of the plurality of draft facets; and
   smoothing one or more portions of the first die block that correspond to at least a portion of the plurality of slope facets, wherein the one or more portions of the first die block that correspond to at least a portion of the plurality of slope facets are smoothed subsequent to adding textures to one or more portions of the first die block that correspond to at least a portion of the plurality of draft facets.

2. The method of claim 1, wherein:
   one or more portions of the first die block that correspond to the plurality of slope facets have a first die surface roughness; and
   the one or more portions of the first die block that correspond to at least a portion of the plurality of draft facets have a second die surface roughness that is greater than the first die surface roughness.

3. The method of claim 2, wherein:
   an average of the second die surface roughness is 50 nm or more.

4. The method of claim 1, wherein:
   adding textures to the one or more portions of the first die block includes increasing a roughness of the one or more portions of the first die block that correspond to at least a portion of the plurality of draft facets.

5. The method of claim 1, wherein:
   adding textures to the one or more portions of the first die block includes sanding the one or more portions of the first die block that correspond to at least a portion of the plurality of draft facets.

6. The method of claim 1, wherein:
   adding textures to the one or more portions of the first die block includes forming, with a cutting tool, markings on a surface of the one or more portions of the first die block that correspond to at least a portion of the plurality of draft facets.

7. The method of claim 1, wherein:
   smoothing the one or more portions of the first die block includes polishing the one or more portions of the first die block.

8. A die block made by the method of claim 1.

9. A method of making a Fresnel lens, the method comprising:
   obtaining the first die block made by the method of claim 1;
   obtaining a second die block that is distinct and separate from the first die block;
   coupling the first die block and the second die block;
   providing a molding material into a space defined between the first die block and the second die block;
   cooling the molding material located between the first die block and the second die block to form a Fresnel lens; and
   removing the Fresnel lens from at least one of: the first die block and the second die block.

10. A Fresnel lens made by the method of claim 9.

11. The Fresnel lens of claim 10, wherein:
    the lens includes a plurality of slope facets having a first lens surface roughness and a plurality of draft facets having a second lens surface roughness that is greater than the first lens surface roughness.

12. The Fresnel lens of claim 11, wherein:
    the plurality of draft facets is coated with a masking material and the plurality of slope facets is not coated with the masking material.

13. A method of making a Fresnel lens, the method comprising:
    obtaining a first die block that defines at least one or more portions of a Fresnel lens, the one or more portions defined in the first die block corresponding to a plurality of slope facets and a plurality of draft facets; and
    adding textures to one or more portions of the first die block that correspond to at least a portion of the plurality of draft facets;
    obtaining a second die block that is distinct and separate from the first die block;
    coupling the first die block and the second die block;
    providing a molding material into a space defined between the first die block and the second die block;
    cooling the molding material located between the first die block and the second die block to form a Fresnel lens, wherein the Fresnel lens includes the plurality of slope facets and the plurality of draft facets;
    removing the Fresnel lens from at least one of: the first die block and the second die block; and
    coating at least a portion of the plurality of draft facets of the Fresnel lens with a masking material.

14. The method of claim 13, wherein:
    the masking material includes black paint.

15. The method of claim 13, wherein:
    coating at least a portion of the plurality of draft facets of the Fresnel lens with the masking material includes coating at least the portion of the plurality of draft facets of the Fresnel lens with the masking material without coating the plurality of slope facets with the masking material.

16. The method of claim 13, wherein:
    the Fresnel lens includes a first surface that includes the plurality of slope facets and the plurality of draft facets and a second surface that is opposite to the first surface; and
    coating at least a portion of the plurality of draft facets of the Fresnel lens with the masking material includes spin coating the first surface with the masking material.

17. The method of claim 16, wherein:
    spin coating the first surface with the masking material causes the masking material to remain on at least the portion of the plurality of draft facets and forgo remaining on at least a portion of the plurality of slope facets.

18. The method of claim 17, wherein:
    at least 90% of the plurality of slope facets is not covered by the masking material.

19. A Fresnel lens made by the method of claim 13.

20. The Fresnel lens of claim 19, wherein:
    the plurality of slope facets is not coated with the masking material.

* * * * *